Patented June 29, 1954

2,682,535

UNITED STATES PATENT OFFICE 2,682,535

HYDROXYALKYLATION OF POLYSACCHARIDES

Aubrey E. Broderick, South Charleston, W. Va., assignor to Union Carbide and Carbon Corporation, a corporation of New York No Drawing. Application November 28, 1950, Serial No. 198,034

12 Claims. (Cl. 260—231)

This invention relates to the production of hydroxyalkyl ethers of polysaccharides, and more especially it concerns a novel process for the production of water-soluble and/or alkali-soluble hydroxyalkyl ethers of cellulose and of starches under conditions whereby the polysaccharide material and the derivatives thereof are continuously maintained in substantially the same physical form as that of the original cellulose or starch throughout each stage of the process, and the final hydroxyalkyl ether of the cellulose or starch is readily purified from alkali metal salts, caustic alkali and organic byproducts in simple manner. For convenience, the following description is directed principally to the production of water-soluble hydroxyethyl cellulose.

For many years water-soluble hydroxyethyl celluloses have been made by reacting a cellulose with an aqueous solution of a caustic alkali to produce an alkali cellulose which is shredded and, after suitable aging for 24 hours or more, is etherified with 75% to 90% or more of ethylene oxide. In commercial practice the etherified product then is dissolved in water, filtered, and commonly dialyzed to remove caustic alkali, using a copious supply of water. Practical difficulties in filtering and dialyzing the viscous solutions of these high molecular weight cellulose ethers seriously limit the molecular weights of the cellulose ethers that can be successfully processed in this manner. Residual caustic alkali in the aqueous solutions of the cellulose ether is neutralized with a suitable acid, and the resultant product is marketed in solution form, or it is spray dried. The high viscosity of high molecular weight hydroxyethyl ethers of cellulose places a limit upon the molecular weight of the ethers that can be effectively dialyzed and spray dried.

The invention has outstanding utility over prior processes in the preparation of both water-soluble and water-insoluble but alkali-soluble hydroxyalkyl polysaccharides. By its use these ethers containing only small amounts of ash-forming impurities can be produced directly in the dry state. This permits the storage of the products for an indefinite time in relatively inexpensive containers without appreciable deterioration. Heretofore, where the ether products were made at one location and used elsewhere, it has been necessary either to remove the caustic soda by some suitable treatment or to dissolve the product in water and ship a dilute solution thereof. In the latter case the time element between production and use becomes important because of the general loss in molecular weight of these products while dissolved in caustic soda.

Among the more important objects of this invention are the following: the elimination of the preparation of alkali cellulose as a separate step in the production of an hydroxyalkyl cellulose, and the concurrent preparation of the alkali cellulose and its hydroxyalkylation in the same equipment; the maintenance of the cellulose, the intermediate alkali cellulose and the hydroxyalkyl cellulose product in solid or fibrous form during each step of the process; the provision in novel manner for producing water-soluble hydroxyethyl celluloses and hydroxyethyl starches of very high molecular weights that are readily purified by treatment with solvents for the caustic alkali in which solvents the hydroxyethyl celluloses and hydroxyethyl starches are insoluble; the reduction in the amount of caustic alkali required for the production of water-soluble hydroxyethyl ethers of cellulose and of starches; and the production of hydroxyalkyl celluloses and hydroxyalkyl starches under conditions facilitating ready recovery of the alkylene glycol byproducts concurrently produced.

These and other objects are attained in the practice of this invention by a process which comprises forming a dispersion or slurry of a polysaccharide, such as a reactive cellulose, e. g., cotton linters, alpha celluose and chemically treated wood pulp, and the like, or a slurry of a reactive starch such as corn starch, dispersed in a primary, secondary or tertiary alkanol, a mixture of such alkanols, or a mixture of such an alcohol with minor amounts of certain alkoxyalkanols, of the types hereinafter described. The cellulose or starch in the slurry then is agitated and reacted for a short time, commonly around 1 to 2 hours, with a dilute aqueous solution of a strong alkali, such as a caustic alkali, preferably caustic soda of around 15% to 30% strength, at temperatures below 50° C., and desirably between 5° C. and 30° C. Then the slurry, after cooling, if necessary, to bring it to below room temperature, has added thereto between 10% and 105% or more of an alkylene oxide, based upon the dry weight of the cellulose starting material, while agitating the mixture. Alkylene oxides of the type

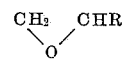

wherein R represents hydrogen, or the methyl or vinyl radical are particularly useful. The production of uniform water-soluble hydroxyethyl polysaccharides requires the use in the etherification of between 75% and 105% or more of ethylene oxide, based upon the dry weight of the polysaccharide starting material. The etherified slurry then is heated for periods up to 6 to 10 hours or more at temperatures within the range from about 10° C. to 50° C., after which it is cooled to room temperature or below, and commonly to 10° C.–20° C. When the caustic alkali content of the slurry is low as in the case of starch, a temperature of 40° C. is preferable. When propylene oxide is used the temperature is preferably 40° C.–50° C. to speed the reaction.

The resultant reaction mixture is filtered, centrifuged or otherwise treated to isolate the liquid portion. The latter can be fractionally distilled to recover any unreacted alkylene oxide and glycol by-products present therein.

Preferably, before the addition of the caustic alkali solution and the alkylene oxide to the slurry of the alcoholic dispersant and polysaccharide, the reaction vessel used is purged with nitrogen, and during the reaction a slight pressure of nitrogen is maintained on the slurry with continuous agitation thereof. This facilitates the production of water-soluble products of high molecular weights. The hydroxyethyl celluloses thus produced commonly have high average molecular weights such that 5% aqueous solutions thereof have viscosities at 20° C. of from 1,500 to 100,000 centipoises or more, as measured with Brookfield & Hoeppler viscosimeters. The hydroxyethyl starches produced generally have average molecular weights such that 5% aqueous solutions thereof have viscosities at 20° C. of between 10 and 500 centipoises.

The maintenance of the cellulose and successive derivatives thereof throughout the process in substantially the same physical form as the original polysaccharide facilitates purification of the isolated solid hydroxyethyl polysaccharide ether to any desired degree by extraction with suitable solvents. Although methanol is the best known organic solvent for caustic soda, it has such a swelling effect upon the water-soluble type of hydroxyethyl celluloses that extraction is rendered difficult. The extractants used, therefore, are mixtures of methanol with substantial amounts of non-swelling agents for the water-soluble hydroxyethyl polysaccharides, such as acetone and isopropanol. Water-soluble hydroxyethyl starches having high percentages of combined ethylene oxide require extractants relatively low in methanol content.

It is impracticable to remove the last traces of caustic alkali from the hydroxyalkyl polysaccharides by extraction with organic solvents. Hence, the solid residue from the extraction is neutralized by a mineral acid such as hydrochloric, sulfuric or phophorsic acid, or an organic acid, such as acetic, monochloroacetic, maleic or glycollic acid, or the equivalent, by adding the acid to a slurry of the hydroxyalkyl ether in the extraction mixture. The neutralized product then is dried in a current of air, commonly at 50° C.–60° C., or by vacuum drying.

In order to secure uniform hydroxyalkylated products, those monohydric alcohols, or the mixtures thereof with alkoxyalkanols, useful in the practice of this invention, should hold or be capable of holding in solution at a temperature of 20° C.–25° C. a slight amount, e. g., around 0.01% to 0.4%, of caustic alkali, without dissolving other than such slight amounts thereof. This small amount of caustic alkali in the alcohol appears to be necessary to redistribute and level off the caustic alkali concentration throughout the slurry. Preferably, the alcohol should hold not more than around 0.13% to 0.2% of the caustic alkali, since otherwise a higher conversion of the alkylene oxide to glycols results. The solvent capacity of the alcohol or alcohol mixtures for the caustic alkali conveniently is determined by intimately mixing the alcohol or mixture of alcohols with a 22% aqueous solution of caustic soda at 20° C.–25° C. for a sufficient time to establish equilibrium, and determining the caustic soda content by weight of the alcohol phase after stratification. Under those conditions the caustic soda solubility of the tertiary butanol-water azeotrope used in Example 1 was 0.13%; that of the alcohol mixture used in Example 3 was 0.011%; that of the alcohol of Example 5 was 0.016%; and that of pentanol-3 containing 3.6% of water, which yielded an unevenly hydroxyalkylated product partially soluble in water, was nil.

The alcoholic dispersant should hold or be capable of holding a small amount, e. g., around 0.5% to 5% or more, of water in solution or dispersion while in contact with the aqueous caustic alkali phase of the slurry of reactants. The alcoholic dispersant also must be such that the alcohol-water phase of the slurry is incapable of dissolving either the alkali cellulose, the alkali starch, or the hydroxyalkyl ether of the cellulose or of the starch as formed in the process. For best results the moisture content of the alcohol should be such that the alcohol phase of the slurry does not extract substantial amounts of water from nor impart water to the aqueous caustic alkali phase in contact therewith during the etherification reaction.

The alcohols useful as slurrying or dispersing agents in the practice of the invention include those primary alkanols having from 4 to 10 carbon atoms, and those secondary and tertiary alkanols having from 3 to 10 carbon atoms. Suitable alcohols include isopropanol, and the primary, secondary and tertiary butanols, pentanols, hexanols, octanols, and decanols. In the case of those alkanols of this group which are not capable of dissolving very small amounts, preferably not more than 0.13% of caustic alkali from the aqueous caustic alkali phase of the slurry, this condition is rectified effectively by mixing with such alkanols relatively small proportions, e. g., around 5% to 25%, of certain alkanols or of alkoxyalkanols capable of imparting the necessary low solvent capacity for the caustic alkalies. Among such auxiliary dispersing agents are isopropanol, the butanols, 2-methoxyisopropanol, 2 - ethoxyisopropanol and 2 - isopropoxyisopropanol.

To illustrate, neither anhydrous pentanol-3, water-saturated pentanol-3, or pentanol-3 containing around 3.6% of water, when used in the process with flocked cellulose and ethylene oxide, yielded hydroxyethyl celluloses that were free from water-insoluble portions. Upon the addition to the pentanol-3 of from 10% to 15% of its weight of methoxyisopropanol, the alcohol mixing dissolved a slight amount of caustic soda, and yielded in the process a good water-soluble hydroxyethyl cellulose, comparable with those secured when using as solvent in the process isopropanol containing 9% water, and tertiary butanol containing 11.5% water.

In the practice of the invention the weight ratio of the dry polysaccharide to the alcohol or alcohol mixture can range from slightly above 1:1 to 1:15 or more. When using caustic soda as the caustic alkali in the process, amounts thereof ranging from 20% to 50% based upon the weight of the dry cellulose, have, upon etherification with ethylene oxide, given good water-soluble hydroxyethyl celluloses, while only a few per cent thereof is required for the production of water-soluble hydroxyethyl starches by the process. In the production of alkali-soluble hydroxyalkyl celluloses by the process much smaller amounts of caustic soda can be used. When using caustic potash, around 35% thereof, based upon the cellulose, yielded an hydroxyethyl cellulose about 50% of which was water-soluble. The ratio of caustic alkali to water usually is such as to provide, in the slurry, solutions containing 10% to 30% of the alkali.

The amount of water present in the slurry subjected to etherification with the alkylene oxide may vary widely, commonly ranging between 10% and 300% or more, based upon the dry weight of the polysaccharide. The smaller amounts are preferred when etherifying the alkali-treated starches by the process.

It is surprising that under the conditions of the process, good yields of hydroxyalkyl celluloses are secured and that little or none of the alkylene oxide reacts with the alcohol to form the corresponding alkoxyalkanol. Since fairly large amounts of caustic soda are present in the system, it would be predicted that a relatively large proportion of the alkylene oxide would be converted to corresponding alkoxyalkanols, with low yields of hydroxyalkyl celluloses. Indeed, when attempting to use methanol and ethanol it was found that the reaction producing the alkoxyalkanols prevailed almost exclusively. When using isopropanol, tertiary butanol and pentanol-3, none of the alkoxyalkanols were formed; and n-butanol was almost equally effective.

Alkylene oxides are known to react with water, especially in the presence of a caustic alkali, to form glycols and polyglycols. The formation of these products in the present process has been minimized, in part by reducing the amount of caustic alkali to less than around 50%, based upon the dry weight of the cellulose, in part by lowering the water content of the slurry being reacted, and in part by preventing the temperature from rising above around 50° C. during the etherification reaction. The low solubility of caustic soda in the alcohol dispersing medium is also believed to be an important contributing factor. However, this process has the important advantage over prior processes that any glycols produced are easily recoverable in a usable form not highly diluted with water. In prior processes, involving the purification of the water-soluble cellulose ethers by dialysis, the dilution of the glycols with water was so great that recovery of the glycols was not practicable.

The use, as dispersants, of the higher alkanols having 5 to 10 carbon atoms, if necessary, in admixture with a small amount of an alkanol or an alkoxyalkanol as herein described, has the outstanding practical advantage that, after filtration of the reaction mixture and extraction of the hydroxyalkyl cellulose or starch with a practicable extractant such as a 60:40% by weight mixture of methanol and acetone, the components of the resultant extract readily can be separated and recovered by conventional fractional distillation procedures. Surprisingly, when using isopropanol, such a separation is not practicable. When extracting hydroxyethyl celluloses low in hydroxyalkyl content and hydroxypropyl celluloses of any hydroxypropyl content, methanol alone can be used.

The invention is illustrated by the following examples wherein all parts and percentages are given in terms of weight unless otherwise indicated.

Example 1

Fifty-two parts of a flocked chemical wood pulp high in alpha cellulose, of 40 mesh size or finer, containing 5.65% moisture, were dispersed or slurried by agitation in 463.5 parts of 91% (by volume) isopropanol (the isopropanol-water azeotrope) at a temperature of 25° C.–26° C. With agitation 125.6 parts of a 21.8% aqueous solution of caustic soda were added during an hour. Thereafter, the slurry was cooled to 10° C., and 51.1 parts of ethylene oxide were added during 4 minutes. The mixture was brought to 30° C. and held there for 3 hours, and then heated at 35° C. for 3 hours. Before addition of the caustic soda solution and ethylene oxide the reaction vessel was purged with nitrogen, and the reactions were conducted in an atmosphere of nitrogen under low pressure.

The cooled reaction mixture was filtered to separate the liquids from the undissolved hydroxyethyl cellulose. The solids portion was extracted with a 60:40 mixture of methanol and acetone (by weight) to remove most of the caustic alkali, and then was neutralized with glacial acetic acid. It then was dried in air at 50° C.–60° C. The 64.4 parts of hydroxyethyl cellulose recovered were substantially completely soluble in cold water, and upon analysis had a zero ash content. Aqueous solutions containing 2% and 5% of the cellulose ether had viscosities at 20° C. of 525 centipoises and 67,000 centipoises, respectively.

The liquid portion from the filtration was fractionally distilled, and 1.71 parts of unreacted ethylene oxide and 23.3 parts of ethylene glycols having average molecular weights of 118 were recovered.

Example 2

A run was conducted under conditions substantially identical with that of Example 1 excepting that air was not excluded during the reaction. The resultant hydroxyethyl cellulose was substantially completely soluble in cold water. It had an ash content of 1.6%. Aqueous solutions containing 2% and 5% of this cellulose ether had viscosities at 20° C. of 48.4 and 1,900 centipoises, respectively.

Example 3

To 94.1 parts of a flocked chemical wood pulp cellulose (having 4.7% moisture content) were added 324.6 parts of anhydrous tertiary butanol and 42 parts of water. During continuous agitation of the resultant dispersion at 5° C.–5.5° C., 96.8 parts of a 22% aqueous solution of caustic soda were added dropwise during 1 hour. Then 73.6 parts of ethylene oxide were added during 5 minutes. Nitrogen was used to exclude air in the reaction vessel throughout the reactions involved. After the ethylene oxide had been added, the reaction mixture was raised to 30° C., held there for around 3.25 hours, and then heated at 35° C. for 3 hours. The reaction mixture was cooled to 10° C. and was filtered. The filtered solids were processed in the manner described in Example 1, yielding 138.8 parts of the hydroxyethyl cellulose which was over 99% soluble in cold water. Aqueous solutions containing 2% and 5% of this cellulose ether had viscosities at 20° C. of 171 and 6,050 centipoises, respectively.

Example 4

Following the procedure and using the reactants described in Example 3, with the exception that 365.9 parts of isopropanol containing 9% of water were used as the dispersant (in place of the tertiary butanol and 42 parts of water), 134 parts of a completely cold water-soluble hydroxyethyl cellulose having an ash content of 0.5% were secured. Aqueous solutions thereof containing 2% and 5% of the cellulose ether had viscosities at 20° C. of 198 and 8,300 centipoises, respectively.

Example 5

To 93.4 parts of flocked chemical wood pulp, high in alpha cellulose, having a particle size no greater than 40 mesh, and containing 4.9% of water, was added with agitation a mixture of 476.3 parts of pentanol-3 containing 3.6% of water, and 54.3 parts of 2-methoxyisopropanol. The reaction vessel was purged with nitrogen and the reactions were conducted in an atmosphere of nitrogen. The slurry of cellulose and alcohols was cooled to 5° C., and 100.2 parts of an approximately 22% aqueous solution of caustic soda were added dropwise over a period of 0.75 hour with agitation which was continued for another 0.5 hour at 5° C. Then 73.8 parts of ethylene oxide were added to the slurry during 3 minutes, after which the slurry was heated to 30° C. with agitation and held there for over 4.5 hours. The temperature then was raised to 35° C. and the slurry heated at that temperature for 5 hours. The slurry then was cooled, filtered, and the respective solid hydroxyethyl cellulose portion and the liquid portion were treated in the general manner described in Example 1. A yield of 140.3 parts of hydroxyethyl cellulose having an ash content of 0.83% was secured. This product was substantially completely soluble in cold water. Aqueous solutions thereof containing 2% and 5% of the cellulose ether had viscosities at 20° C. of 82 and 3,000 centipoises, respectively.

Example 6

A slurry was made of a mixture of 93.1 parts of the chemical wood pulp cellulose recited in Example 5, 423 parts of n-butanol and 23 parts of water, and this slurry then was processed according to the general procedure described in Example 5. A yield was secured of 131.8 parts of an hydroxyethyl cellulose having an ash content of 0.76%. Over 92% thereof was soluble in cold water. A 2% aqueous solution had a viscosity at 20° C. of 143 centipoises.

Example 7

A slurry was made by mixing with agitation in a closed vessel in an atmosphere of nitrogen, 200 parts of a commercially available powdered corn starch containing 9.8% of moisture, 333.4 parts of pentanol-3 containing 3.6% of water, and 58.9 parts of 2-methoxyisopropanol. The slurry then was cooled to 5° C. and the vessel purged with nitrogen. A nitrogen atmosphere thereafter was maintained. Then 32.2 parts of a 22% aqueous solution of caustic soda were slowly added and reacted for around 0.5 to 1.25 hours at 5° C. Thereafter, 145 parts of ethylene oxide were added during a few minutes and the slurry was heated at 35° C. for about 5 hours, and then at 40° C. for about 5 hours.

The reaction mixture was filtered, thereby removing most of the liquid portion of the slurry. The solids residue from the filtration was reslurried in acetone and filtered twice. The second reslurry was treated with glacial acetic acid to neutralize the residual caustic soda present, and was vacuum dried at 25° C. A yield of 299.4 parts of the purified hydroxyethyl starch was recovered, which contained 3.8% of sodium acetate. It dissolved completely in cold water, and was readily convertible to films of excellent clarity. A 5% aqueous solution thereof had a viscosity at 20° C. of 363 centipoises.

Example 8

A slurry was made of a mixture of 93.2 parts of the chemical wood pulp cellulose recited in Example 5, 54.2 parts of 2-methoxyisopropanol and 477.2 parts of pentanol-3 containing 3.6% of water, and this slurry then was processed according to the procedure described in Example 5, with the exception that 100.1 parts of a 30.85% aqueous caustic potash solution were substituted for the caustic soda. A yield of 133 parts of an hydroxyethyl cellulose having an ash content of 1.84% and a moisture content of 6.6% was secured. It was completely soluble in a 7% aqueous caustic soda solution at 25° C., but only 50% thereof was soluble in cold water.

Example 9

A slurry was made of a mixture of 52 parts of a chemical wood pulp containing 4.4% moisture and 514 parts of isopropanol containing 9% by volume of water. This slurry then was processed according to the procedure described in Example 2, but using 131 parts of a 22% aqueous solution of caustic soda and 8.7 parts of 99.6% ethylene oxide. The resultant hydroxyethyl cellulose was completely insoluble in cold water, but was completely soluble in a 5% aqueous solution of caustic soda upon freezing and then thawing with agitation. It had an ash content of 0.85%, and a moisture content of 4.86%.

Example 10

Following the procedure described in Example 2, 51.9 parts of a flocked chemical wood pulp having 4.7% of moisture was made into a slurry with 464 parts of isopropanol containing 9% by volume of water, and the slurry was treated in the manner therein described, using 127.2 parts of a 22.2% aqueous caustic soda solution; and using 55 parts of propylene oxide in place of the ethylene oxide. The resultant hydroxypropyl cellulose had an ash content of 0.31% and a moisture content of 1.12%. It was substantially completely soluble in a 7% aqueous solution of caustic soda without freezing the solution. The solution was convertible to a clear film resembling "Cellophane" in mechanical properties by precipitating a thin layer thereof in an aqueous solution of sodium bisulfate, washing, plasticizing with glycerine and drying.

Example 11

Following the procedure and using the reactants and alcohols described in Example 5 with the exception that 119 parts of butadiene monoxide were used in place of ethylene oxide, 98.1 parts of an hydroxyalkyl cellulose were secured having an ash content of 0.57% and a moisture content of 8.65%. The product dissolved in a 7% aqueous solution of caustic soda upon freezing and then thawing the solution with agitation. The resultant clear solution was converted into a clear film resembling "Cellophane" by the procedure described in Example 10.

Example 12

Following the procedure described in Example 7, but using the specified reactants and alcohols in the following amounts—

400 parts of the powdered corn starch
655.7 parts of pentanol-3 (containing 3.6% water)
118.1 parts of 2-methoxyisopropanol
66.3 parts of 22% aqueous caustic soda solution
108.5 parts of ethylene oxide 503.2 parts of an hydroxyethyl starch were produced having a moisture content of 7.6% and a sodium acetate content of 6.2%. The product was substantially insoluble in cold water, but was completely soluble in water at 90° C. to form a clear mobile solution. Upon cooling this solution to 25° C. the viscosity increased but mobility was retained. The solution was converted to a clear film upon drying on a glass plate. Such films have a high surface hardness, and excellent adhesion to most surfaces. This product is useful as a textile size.

The invention is susceptible of modification within the scope of the appended claims.

I claim:

1. Process for producing an hydroxyalkyl ether of a polysaccharide of the class consisting of celluloses and starches, which comprises dispersing a finely divided polysaccharide selected from the class consisting of the celluloses and starches in a liquid dispersant selected from the class consisting of mixtures containing at least one monohydric alkanol having 4 to 10 carbon atoms which is not capable of dissolving substantial amounts of caustic alkali at temperatures around 20° C.–25° C., together with between 5% and 25%, based upon the weight of said alkanol, of a monohydric alcohol capable of dissolving a slight amount but at least 0.01% of its weight of a caustic alkali at said temperatures, said last-named alcohol being a 2-alkoxyisopropanol having from 1 to 4 carbon atoms in the alkoxy group, and agitating the resultant dispersion with a caustic alkali, water and an alkylene oxide having 2 to 4 carbon atoms, at elevated temperatures no higher than 50° C., while maintaining in the solid state the polysaccharide and the derivatives thereof produced, and recovering from the reaction mixture the hydroxyalkyl ether of a polysaccharide selected from the class consisting of the celluloses and starches present therein.

2. Process for producing an hydroxyalkyl ether of a polysaccharide of the class consisting of celluloses and starches, which comprises dispersing a polysaccharide selected from the class consisting of the celluloses and starches in a liquid dispersant selected from the class consisting of mixtures containing at least one monohydric alkanol having 4 to 10 carbon atoms which is not capable of dissolving substantial amounts of caustic alkali at temperatures around 20° C.–25° C., together with between 5% and 25%, based upon the weight of said alkanol, of a monohydric alcohol capable of dissolving between about 0.01% and about 0.4% of its weight of caustic alkali at said temperatures, said last-named alcohol being a 2-alkoxyisopropanol having from 1 to 4 carbon atoms in the alkoxy group, and agitating the resultant dispersion with a caustic alkali, water and an alkylene oxide at an elevated temperature no higher than 50° C. while continuously maintaining in the solid state the polysaccharide and the derivatives thereof produced in the process, and recovering from the reaction mixture the hydroxyalkyl polysaccharide selected from the class consisting of the celluloses and starches thus produced.

3. Process as defined in claim 2 wherein the polysaccharide is a cellulose.

4. Process as defined in claim 2 wherein the polysaccharide is a starch.

5. Process as defined in claim 2 wherein said alkylene oxide is ethylene oxide.

6. Process as defined in claim 2 wherein said alkylene oxide is propylene oxide.

7. Process as defined in claim 2 wherein said alkylene oxide is butadiene monoxide.

8. Process as defined in claim 2 wherein said alkylene oxide is ethylene oxide in amount at least 75% of the dry weight of said polysaccharide, and the product is a hydroxyalkyl ether of such polysaccharide that is completely soluble in water.

9. Process for producing a water-soluble hydroxyethyl ether of cellulose, which comprises dispersing a cellulose in a liquid dispersant selected from the class consisting of mixtures containing at least one monohydric alkanol having 4 to 10 carbon atoms which is not capable of dissolving substantial amounts of caustic soda at temperatures of 20° C.–25° C., together with between 5% and 25%, based upon the weight of said alkanol, of a monohydric alcohol capable of dissolving between about 0.01% and about 0.4% of its weight of caustic soda at said temperatures, the last-named alcohol being a 2-alkoxyisopropanol having 1 to 4 carbon atoms in the alkoxy group, and agitating the resultant dispersion with caustic soda and water, together with at least 75% of ethylene oxide, based upon the dry weight of the cellulose, at an elevated temperature no higher than 50° C., while continuously maintaining in the solid state the cellulose and the derivatives thereof produced in the process, and recovering from the reaction mixture the water-soluble hydroxyethyl cellulose thus produced.

10. Process for producing an hydroxyalkyl ether of cellulose, which comprises dispersing a cellulose in a mixture of a pentanol and a minor portion, based upon the weight of the pentanol, of a 2-alkoxyisopropanol having from 1 to 4 carbon atoms in the alkoxy group, in the presence of water and a caustic alkali, and agitating the resultant dispersion with an alkylene oxide having two to four carbon atoms, at elevated temperatures no higher than 50° C. while maintaining in the solid state the cellulose and the hydroxyalkyl cellulose thus produced.

11. Process for producing a water-soluble hydroxyethyl ether of cellulose, which comprises dispersing a cellulose in a mixture of 3-pentanol and a minor portion, based upon the weight of the pentanol, of a 2-alkoxyisopropanol having from 1 to 4 carbon atoms in the alkoxy group, in the presence of water and a caustic alkali, and agitating the resultant dispersion with ethylene oxide at elevated temperatures no higher than 50° C., while maintaining in the solid state the cellulose and the hydroxyethyl cellulose produced.

12. Process as defined in claim 11 wherein between 5% and 25% of the alkoxyisopropanol, based upon the weight of the 3-pentanol, is used.

References Cited in the file of this patent

UNITED STATES PATENTS

| Number | Name | Date |
|---|---|---|
| 2,572,039 | Klug et al. | Oct. 23, 1951 |